United States Patent [19]
Hines

[11] Patent Number: 5,854,517
[45] Date of Patent: Dec. 29, 1998

[54] COMMUNICATIONS LINK BETWEEN A TRACTOR AND TRAILER UTILIZING TRACTOR CIRCUITRY

[75] Inventor: Antonio Hines, Tampa, Fla.

[73] Assignee: Grote Industries, Inc., Madison, Ind.

[21] Appl. No.: 957,423

[22] Filed: Oct. 24, 1997

Related U.S. Application Data

[63] Continuation of Ser. No. 807,665, Feb. 27, 1997, abandoned.

[51] Int. Cl.$^6$ ...................................................... G08B 21/00
[52] U.S. Cl. ........................ 307/10.8; 307/10.1; 340/431; 340/310.01
[58] Field of Search ..................................... 307/9.1, 10.1, 307/10.6, 10.7, 10.8, 38, 39, 1, 2, 3; 340/431, 825.06, 310.01, 310.06, 310.07, 465, 468, 475; 280/DIG. 14; 315/77; 701/1, 36, 69, 70

[56] References Cited

U.S. PATENT DOCUMENTS

| | | |
|---|---|---|
| 4,300,126 | 11/1981 | Gajjar . |
| 4,405,190 | 9/1983 | Schroeder . |
| 4,780,618 | 10/1988 | Wareman et al. . |
| 4,857,807 | 8/1989 | Hargis . |
| 4,897,642 | 1/1990 | DiLullo et al. . |
| 4,926,158 | 5/1990 | Zeigler . |
| 4,952,908 | 8/1990 | Sanner . |
| 5,032,821 | 7/1991 | Domanico et al. . |
| 5,090,779 | 2/1992 | Kramer . |
| 5,142,278 | 8/1992 | Moallemi et al. . |
| 5,305,316 | 4/1994 | Yoshida et al. . |
| 5,385,476 | 1/1995 | Jasper . |
| 5,387,994 | 2/1995 | McCormack et al. . |
| 5,397,924 | 3/1995 | Gee et al. . |
| 5,442,810 | 8/1995 | Jenquin . |
| 5,488,352 | 1/1996 | Jasper . |
| 5,491,463 | 2/1996 | Sargeant et al. . |
| 5,521,466 | 5/1996 | Vincent . |
| 5,581,246 | 12/1996 | Yarberrry et al. . |
| 5,644,172 | 7/1997 | Hodges . |
| 5,677,667 | 10/1997 | Lesesky et al. . |

OTHER PUBLICATIONS

Transport Topics, "ABS Linkages", p. 65, Aug. 14, 1995.
SAE J560, "Seven Conductor Electrical Connector for Truck–Trailer Jumper Cable", Jun. 1993.
SAE J1067, Seven Conductor Jacketed Cable for Truck Trailer Connections, Oct., 1973.
Federal Register, vol. 60, No. 47, FMVSS 101, Controls and Displays, FMVSS 105, Hydraulic Brake Systems, pp. 13254–13256, Mar. 10, 1995.
Federal Register, vol. 60, No. 47, FMVSS 121, Air Brake Systems, pp. 13256–13259, Mar. 10, 1995.
Department of Transportation, National Highway Traffic Safety Administration, 49 CFR Part 571, "Stability and Control of Medium and Heavy Vehicles During Braking", Dec. 8, 1995.
Department of Transporation, National Highway Traffic Administration, 49 CFR Part 571, "Stability and Control of Medium and Heavy Vehicles During Braking; and Stopping Distance Requirements, Final Rule, Petitions for Reconsiderations", Dec. 8, 1995.

Primary Examiner—Jeffrey Gaffin
Assistant Examiner—Peter Ganjian
Attorney, Agent, or Firm—Woodard, Emhardt, Naughton, Moriarty & McNett

[57] ABSTRACT

A communication link between a tractor and trailer is established utilizing existing dormant tractor and trailer circuitry. In one embodiment of the invention, a tractor communications device has a communications port connected to a turn signal circuit and a trailer communications device has a communications port connected to the same turn signal circuit. The two communications devices permit communications therebetween over the turn signal circuit as long as the turn signal circuit is inactive, and otherwise inhibits such communications. In another embodiment of the invention, each communications device includes a second communications port connected to the remaining tractor/trailer turn circuit. If electrical power is being supplied to the first turn signal circuit, the two communications devices automatically switch communications to the remaining dormant turn signal circuit.

20 Claims, 4 Drawing Sheets

COMMUNICATIONS LINK BETWEEN A TRACTOR AND TRAILER UTILIZING TRACTOR CIRCUITRY

This application is a continuation of application Ser. No. 08/807,665, filed Feb. 27, 1997, now abandoned.

FIELD OF THE INVENTION

The present invention relates generally to systems for establishing a communications link between a tractor and trailer, and more specifically to such systems establishing such a communications link by utilizing existing tractor and trailer circuitry.

BACKGROUND OF THE INVENTION

For the past several decades, electrical power exchange between a tractor and trailer has been accomplished via a seven wire cable, or so-called "umbilical cord". The seven wire cable and associated seven pin connectors have become standard equipment in the tractor/trailer industry and have provided for the supply of electrical power to various trailer electrical functions such as turn signals, brake lamps, tail lamps, side marker lamps, clearance lamps and dome lamps, as well as a ground reference for the these electrical circuits. In an effort to provide uniformity throughout the industry, the society of automotive engineers (SAE) has promulgated standards for both the seven wire cable (SAE J-1067) and associated seven pin connectors (SAE J-560).

As used hereinafter, the term "tractor" refers to any vehicle having another vehicle in tow, and therefore includes medium or heavy duty trucks, tractor trucks and tractor truck/trailer combinations having a further vehicle or vehicles in tow. The term "trailer" as used hereinafter refers to tractor truck trailers, semi-trailers and the like.

Figure 1:
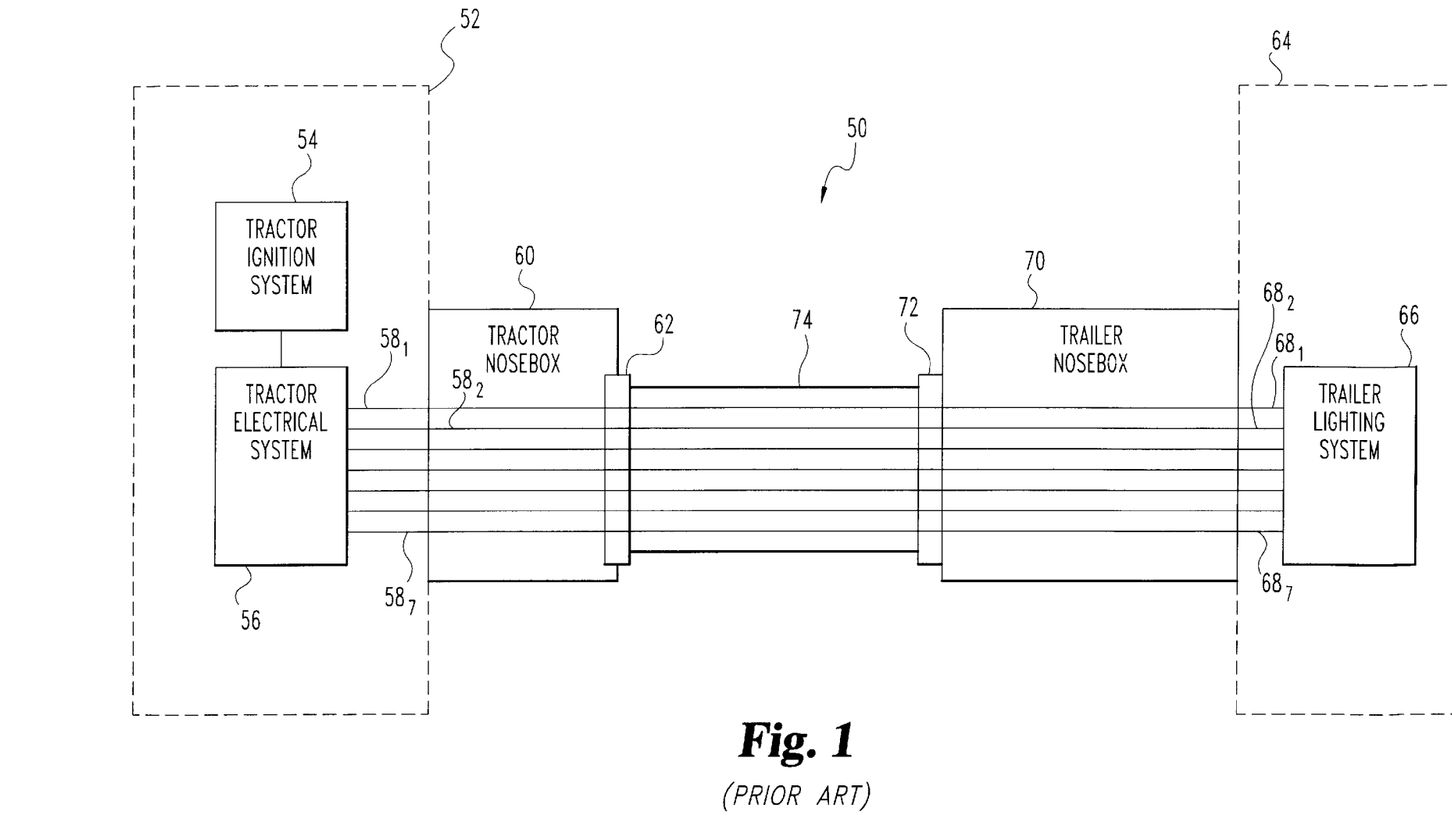
FIG. 1 is a diagrammatical illustration of a prior art electrical interface between a tractor electrical system and a trailer electrical system.

Referring to FIG. 1, an example of a typical prior art electrical connection system 50 for routing electrical power to an electrical trailer system is shown. A tractor 52 includes a tractor ignition system 54 which acts as an electrical power source to provide electrical power to a tractor electrical system 56 when the tractor 52 is in operation. Connected to tractor electrical system 56 are seven electrical lines $58_1$, $58_2$, ..., $58_7$, which are configured in accordance with SAE J-1067 standards. Electrical lines $58_1$, $58_2$, ..., $58_7$ extend from tractor electrical system 56 into a connector housing 60, typically referred lo as a "tractor nosebox", which is typically attached to an exterior surface of tractor 52. Housing 60 has a seven conductor electrical connector 62 associated therewith, to which electrical lines $58_1$, $58_2$, ..., $58_7$ are connected in accordance with SAE J-560 standards.

A trailer 64 includes a trailer Lighting system 66 which is operable to provide the aforementioned trailer lighting functions. Connected to trailer lighting system 66 are seven electrical lines $68_1$, $68_2$, ..., $68_7$, which are configured in accordance with SAE J-1067 standards. Electrical lines $68_1$, $68_2$, ..., $68_7$ extend from trailer lighting system 66 into a connector housing 70, or "trailer nosebox", which is typically attached to an exterior surface of trailer 64. Housing 70 has a seven conductor electrical connector 72 associated therewith, to which electrical lines $58_1$, $58_2$, ..., $58_7$ are connected in accordance with SAE J-560 standards.

A seven-conductor connector/cable 74, or "umbilical cord", connects tractor electrical connector 62 to trailer electrical connector 72 so that the tractor electrical system 56 controls, and provides electrical power to, the trailer lighting system 66. A typical umbilical cord 74 includes an SAE J-1067 seven wire jacketed cable with an SAE J-560 seven conductor connector connected thereto at each end. SAE J-560 and SAE J-1067 require a white wire, which must be at least a No. 8 gauge insulated wire, to be the main ground wire, and a red wire, which must be at least a No. 10 gauge insulated wire, to be the main power wire. Black, yellow, green, brown and blue wires are also provided as general purpose wires, and must each be at least No. 12 gauge wires.

Recently, technological advances in the tractor/trailer industry have spawned the need for providing the trailer or trailers with additional electrical functions, thereby creating the concept of a "smart trailer". Examples of such functions include anti-lock brakes, electronic suspension control and tire pressure sensing, to name a few, as well as diagnostic control and fault detection of such special purpose trailer functions. Thus far, a variety of systems have been developed to provide the electrical infrastructure required to accommodate and operate these additional trailer functions, which leas led to further development of new electrical interfaces operable to transmit both electrical power requirements and data communications between tractors and trailers. Examples of some recent electrical interface designs include electronic circuitry for providing data communication and electrical power routing through multiple J-560 type umbilical cord connectors, through newly developed connectors and cables having more than the standard seven conductor connections, and through the existing seven conductor (J-560/J-1067) electrical interface of FIG. 1.

Although provisions for additional connectors and connector pins may be a viable solution in the short term, this approach is generally a costly solution, particularly since the addition of further functions will require outfitting existing as well as new tractors and trailers with even more connectors and/or connector pins. This approach has the further disadvantage of reducing connector standardization and increasing connector complexity.

An example of one known design utilizing the existing J-560 electrical connector 74 of FIG. 1 to provide data communications and electrical power routing between a tractor and trailer is set forth in U.S. Pat. No. 5,397,924. The design utilizes electronic circuitry to develop a combination multiplexed high speed communication and power link between the tractor and trailer. The design incorporates circuitry for determining whether the tractor is connected, via the J-560 connector, to either a "smart" (multiplexed) trailer or a conventional (non-multiplexed) trailer. If a multiplexed trailer is connected to the tractor, two of the powered electrical wires within the seven wire J-560 connector are used for serial data communications between the tractor and trailer, and the remaining five provide power and ground connections to the trailer electrical systems. If, on the other hand, a non-multiplexed trailer is connected to the tractor, the seven wire J-560 connector is utilized in the conventional fashion, with each of the two communication wires being switched back to its corresponding conventional configuration so that the tractor electrical system controls the trailer lighting system.

Another known design utilizes a single wire communication approach along with switching circuitry operable to convert one of the multipurpose J-1067 wires to a dedicated single communications line upon detection of a "smart" trailer connection to an appropriately outfitted tractor. The dedicated single wire approach utilizes a slower data rate than the two-wire power line communications approach and therefore typically does not suffer from electrical noise problems associated with such two-wire communications.

It is generally considered desirable by owners and operators of heavy duty tractor/trailers to maintain use of the universal J-560 connectors, sockets and associated umbilical cord in connecting a tractor to a trailer, regardless of the trailer configuration. Any other arrangement will require tractors to be outfitted with new electrical connection hardware when hauling "smart" trailers. When hauling conventional trailers, the tractor must either additionally maintain its J-560 electrical connection hardware, or each conventional trailer must be outfitted with the new conventional electrical connection hardware. In any event, requiring new electrical connection hardware on either the tractor or trailer may be too costly and/or too inefficient for heavy duty tractor/trailer owners and operators to implement.

If the universal J-560 style electrical connection hardware is to be used to provide an electrical power and/or communications interface between a tractor and trailer, it must meet several view requirements. First, the interface should include provisions for eliminating, or at least greatly reducing sources of electrical noise such as from electromagnetic interference (EMI). Second, it must be capable of providing(i adequate electrical power capability between the tractor and trailer while maintaining the capability of operating the trailer lighting functions. For example, the National Highway Transportation and Safety Administration (NHTSA) has recently ruled that all trailers manufactured after March of 1998 must be equipped with a trailer anti-lock brake system (ABS), and that the ABS must have a dedicated power line and a dedicated ground line provided thereto. Third, the interface should have adequate power and communications capability to permit new electrically controlled trailer functions and features to be added without requiring additional electrical connection hardware for either the tractor or trailer.

The first requirement, protection against electrical noise, may be met by the dedicated single wire communications approach, but this approach also requires one of the general purpose J-1067 wires to be dedicated strictly to communications functions.

The second requirement, provision of adequate power capability, may not be met by known prior art systems. For example, the system disclosed in U.S. Pat. No. 5,397,924 requires at least two of the seven J-560 conductors for communication purposes, and the dedicated single wire communications approach requires one of the seven J-560 conductors for such purposes. In either case, the remaining conductors may be inadequate for providing power and ground lines to all of the trailer's loads while maintaining control over the trailer's lighting circuits.

The third requirement, provision of adequate power capability for additional trailer features, likewise does not appear to be met by known prior art systems. With one or more of the seven J-560 conductors dedicated to communications in known prior art systems, and in view of the proliferation of new electrically controlled trailer functions, some requiring dedicated power and ground lines provided by the tractor, it appears unlikely that known prior art systems will he equipped to meet future power/ground line requirements.

What is therefore needed is a communications link for establishing communications between a tractor and trailer that utilizes, in a non-disruptive fashion, the existing J-560/J-1067 wiring. Such an arrangement should ideally be generally immune to electrical noise while providing for a maximum number of available general purpose J-1067 wires for use by the trailer lighting system and special purpose trailer electrical systems.

SUMMARY OF THE INVENTION

The foregoing drawbacks of the prior art are addressed by the present invention. In accordance with one aspect of the present invention, a tractor communication system for establishing communications with an external system comprises an electrical connector mounted to a tractor and having a number of electrical terminals adapted for connection to an electrical system external to the tractor, a tractor electrical system including a first turn signal circuit having a first turn signal circuit path connected to one of the electrical terminals of the electrical connector, and a communications device having a first communications port connected to the first turn signal circuit path. The communications device monitors the first communications port and permits communications over the first turn signal circuit path as long as the first turn signal circuit is inactive.

In accordance with another aspect of the present invention, a trailer communication system for establishing communications with an external system comprises an electrical connector mounted to a trailer and having a number of electrical terminals adapted for connection to an electrical system external to the trailer, a trailer electrical system including a first turn signal circuit having a first turn signal circuit path connected to one of the electrical terminals of the electrical connector, and a communications device having a first communications port connected to the first turn signal circuit path. The communications device monitors the first communications port and permits communications over the first turn signal circuit path as long as the first turn signal circuit is inactive.

In accordance with yet another aspect of the present invention, a tractor and trailer communications link comprises a tractor electrical system associated with a tractor and including a first turn signal circuit defining a first turn signal circuit path, a tractor communications device associated with the tractor and having a first communications port connected to the first turn signal circuit path of the tractor electrical system, a trailer electrical system associated with a trailer and including a first turn signal circuit defining a first turn signal circuit path, a trailer communications device associated with the trailer and having a first communications port connected to the first turn signal circuit path of the trailer electrical system, and an electrical connection device extending between the tractor and trailer and connecting the first turn signal circuit path of the tractor electrical system to the first turn signal circuit path of the trailer electrical system to thereby complete a first turn signal circuit. The tractor and trailer communications devices are operable to monitor the first communications ports respectively thereof and permit communication therebetween over the first turn the signal circuit as long as the first turn signal circuit is inactive.

One object of the present invention is to provide a communications link between a tractor and trailer utilizing existing dormant tractor and trailer circuitry.

Another object of the present invention is to provide such a communications link utilizing one or more existing turn signal circuits of the tractor and trailer.

Yet another object of the present invention is to provide such a communications link that inhibits such communications during operation of the turn signal circuit.

Still another object of the present invention is to provide such a communications link that automatically switches communications to the dormant (inactive) turn signal circuit.

These and other objects of the present invention will become more apparent from the following description of the preferred embodiment.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled the art to which the invention relates.

Figure 2:
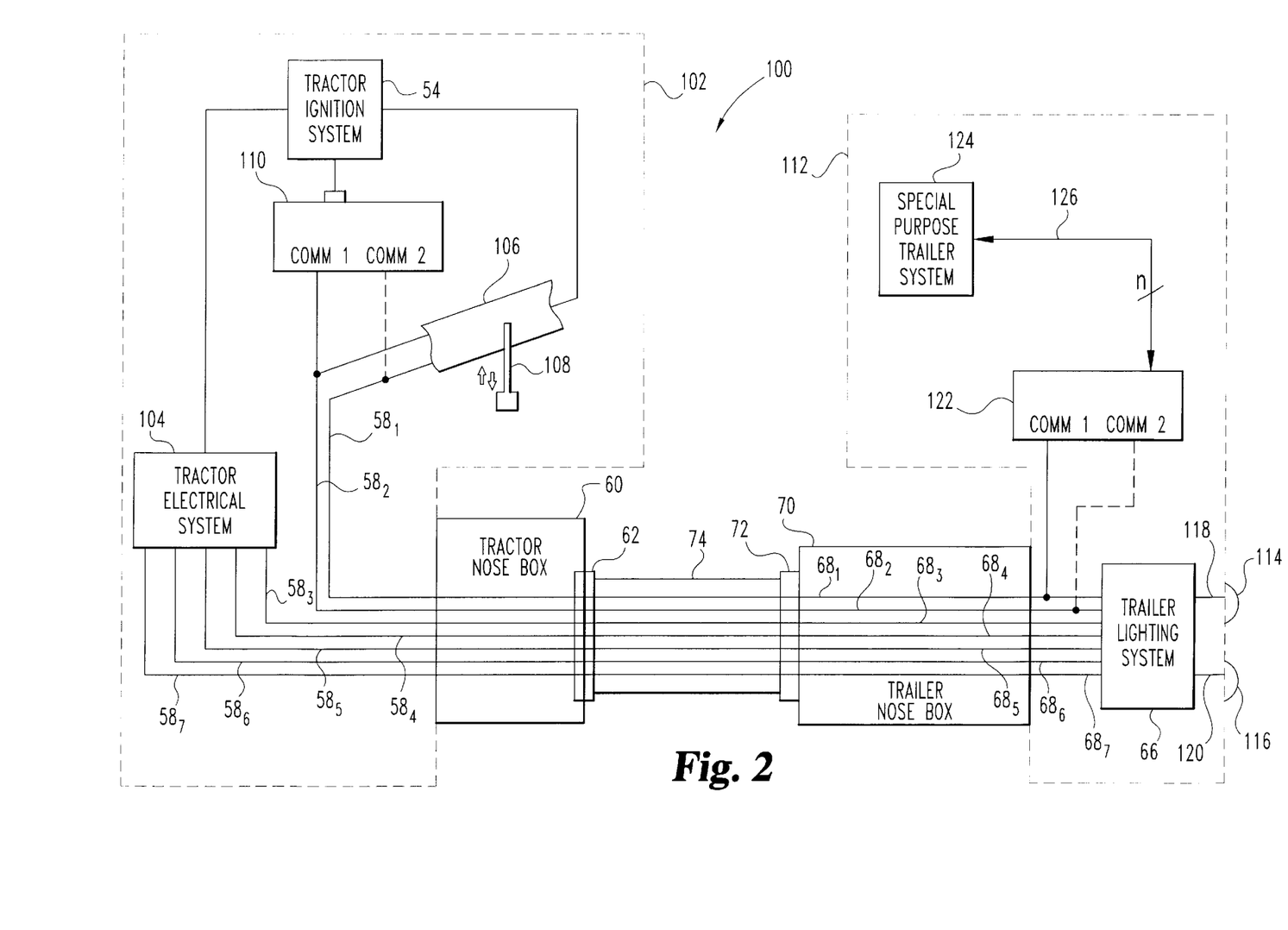
FIG. 2 is a diagrammatical illustration of a communications link between a tractor and trailer, in accordance with one aspect of the present invention, utilizing the existing electrical interface of FIG. 1.

Referring now to FIG. 2, a diagrammatic illustration of one preferred embodiment of a communications link 100 established between a tractor 102 and a trailer 112, in accordance with one aspect of the present invention, is shown. Several of the features shown in FIG. 2 are identical in structure and function to those shown and discussed with respect to FIG. 1, and like numbers will therefore be used to identify like elements.

Tractor 102 is shown in FIG. 2 as having a portion of a tractor electrical system 104 connected to the tractor ignition system 54, wherein the tractor electrical system portion 104 is intended to represent all typical tractor electrical system components with the exception of turn signal circuits. Tractor electrical system portion 104 is therefore illustrated as having electrical lines $58_3$–$58_7$ extending therefrom into electrical connector 62 positioned within tractor nosebox 60. As discussed hereinabove, electrical connector 62 is preferably a known seven conductor SAE J-560 electrical connector having seven electrical terminals formed therein, and electrical lines $58_3$–$58_7$ are each electrically connected to a separate one of the electrical terminals formed within electrical connector 62.

Tractor 102 further includes a first turn signal circuit path $58_2$ and a second turn signal circuit path $58_1$, wherein each circuit: path is electrically connected at one end thereof to a separate one of the remaining two electrical terminals formed within electrical connector 62. The opposite ends of the two turn signal circuit paths $58_1$ and $58_2$ are electrically connected to a means for periodically activating either of the two turn signal circuits. Preferably, the means for periodically activating either of the two turn signal circuits includes a steering column 106 having a turn signal activation lever 108 extending therefrom, wherein the turn signal circuits are powered by tractor ignition system 54. As is known in the art, turn signal activation lever 108 is actuated in one direction, typically upwardly as; indicated by the upward vertical arrow, to select the right turn signal circuit for operation, and is actuated in an opposite direction, typically downwardly as indicated by the downward vertical arrow, to select the left turn signal circuit for operation. Each circuit typically further includes circuit electrical componentry that is operable to periodically activate the selected turn signal circuit, and lo de-select the selected turn signal circuit operation when the vehicle has completed the turn. It is to be understood, however, that the present invention contemplates utilizing other known means for periodically activating either of the two turn signal circuits.

Tractor 102 further includes a communications device 110 defining a first communications port COMM1 and a second optional communication is port COMM2. Communications port COMM1 is electrically connected to either turn signal circuit path, such as turn signal circuit path $58_2$ as shown in FIG. 2, wherein turn signal circuit path $58_2$ may be connected to either of the left or right turn signal circuits. Communications port COMM2 is electrically connected to the remaining turn signal circuit, such as circuit path $58_1$ as shown by the dashed line in FIG. 2. Communications device 110 is preferably a microprocessor-based control computer having memory including at least RAM and ROM, digital and analog I/O and preferably a DUART as is known in the art.

Trailer 112 includes trailer lighting system 66 which is operable to provide the trailer lighting functions discussed in the BACKGROUND section. Connected to trailer lighting system 66 are seven electrical lines $68_1, 68_2, \ldots, 68_7$, which are configured in accordance with SAE J-1067 standards. Electrical lines $68_1, 68_2, \ldots, 68_7$ extend into electrical connector 72 positioned within trailer nosebox 70. As with electrical connector 62, electrical connector 72 is preferably a known seven conductor SAE J-560 electrical connector having seven electrical terminals formed therein, and electrical lines $68_1$–$68_7$ are each electrically connected to a separate one of the electrical terminals formed within electrical connector 72.

Trailer lighting system 66 is further connected to a first turn signaling lamp 114 via signal path 118, and a second turn signaling lamp 116 via signal path 120. Trailer lighting system 66 is operable, as is known in the art, to periodically illuminate the appropriate turn signaling lamp 114 or 116 in accordance with the corresponding turn signal circuit selected from within the tractor 102.

Trailer 112 further includes a communications device 122 defining a first communications port COMM1 and a second optional communications port COMM2. Communications port COMM1 of communications device 122 is electrically connected to the same turn signal circuit path as communications port COMM1 of communications device 110. As illustrated in FIG. 2, communications port COMM1 of communications device 122 is thus electrically connected to electrical line $68_2$. Optional communications port COMM2 of communications device 122 is likewise connected to the same turn signal circuit path as communications port COMM2 of communications device 110, and is therefore connected to electrical line $68_1$ as illustrated by the dashed line in FIG. 2. As with communications device 110, communications device 122 is preferably a microprocessor-based control computer having memory including at least RAM and ROM, digital and analog I/O and preferably a DUART as is known in the art. Trailer 112 may further include a special purpose trailer electrical system 124 which is connected to communication device 122 via n signal paths, wherein n may be an integer. When communication between communications device 122 and communications device 110 is permitted, as will be discussed in greater detail hereinafter, communications device 122 provides information relating to special purpose trailer electrical system 124 over tire established communication path. One example of such information includes diagnostic data relating to the operation of the special purpose trailer electrical system 124.

In operation, both the tractor communications device 110 and the trailer communications device 122 are operable, in accordance with one embodiment of the present invention, to continually monitor their respective COMM1 port and permit communications therebetween over the turn signal circuit path comprising electrical lines $58_2$ and $68_2$ as long as the corresponding turn signal circuit is inactive. Thus, as long as the turn signal circuit corresponding to turn signal circuit path $58_2/68_2$ is riot electrically energized, tractor communications device 110 and trailer communications device 122 may send and receive information therebetween via the COMM1 communications ports. If the turn signal circuit corresponding to turn signal circuit path $58_2/68_2$ is electrically energized, both the tractor communications device 110 and the trailer communications device 122 are operable to inhibit such communications until the turn signal circuit is subsequently de-energized.

In managing such communications, both the tractor communications device 110 and the trailer communications device 122 are operable to continually monitor their respective COMM1 ports to determine whether the turn signal circuit corresponding to turn signal circuit path $58_2/68_2$ is active. In one embodiment of the present invention, the tractor communications device 110 and the trailer communications device 122 continually monitor the electrical noise level present at their respective COMM1 ports. If the electrical noise level is above a predefined noise threshold level, the corresponding turn signal circuit is considered to be active and communications between devices 110 and 122 is inhibited. If, on the other hand, the electrical noise level detected at each of the COMM1 ports is below the predefined noise threshold level, the corresponding turn signal circuit is considered to be inactive and communications between devices 110 and 122 is permitted.

In an alternate embodiment of the present invention, the tractor communications device 110 and the trailer communications device 122 continually monitor the voltage level present at their respective COMM1 ports. If the voltage level at the COMM1 ports is above a predefined voltage threshold level, the corresponding turn signal circuit is considered to be active and communications between devices 110 and 122 is inhibited. If, on the other hand, the voltage level present at the COMM1 ports is below the predefined voltage threshold level, the corresponding turn signal circuit is considered to be inactive and communications between devices 110 and 122 is permitted. In this embodiment, it is intended that an active state of the turn signal circuit corresponds to the tractor battery voltage (approximately 12 volts), and that communications between the COMM1 ports of devices 110 and 122 is carried out using digital signals of between approximately 0–5.0 volts. Thus, the predefined voltage threshold level is preferably set somewhere between 5.0–12.0 volts (or other battery voltage level). IT is to be understood, however, that the present invention contemplates using other voltage levels and ranges to define both the active state of the turn signal circuit and the communication voltage levels, the importance to this embodiment of the present invention being that the predefined voltage level be appropriately set to permit a distinction to be made between turn signal active state voltages and communications- voltages.

In another alternate embodiment of the present invention, the tractor communications device 110 and the trailer communications device 122 continually monitor the electrical current level flowing through the turn signal circuit corresponding to the turn signal circuit path $58_2/68_2$, in accordance with known techniques. If this current level is above a predefined current threshold level, the corresponding turn signal circuit is considered to be active and communications between devices 110 and 122 is inhibited. If, on the other hand, this current level is below the predefined voltage threshold level, the corresponding turn signal circuit is considered to be inactive and communications between devices 110 and 122 is permitted.

In still another alternate embodiment of the present invention, the tractor communications device 110 and the trailer communications device 122 continually monitor the duration of the signals present at their respective COMM1 ports. If the signal duration present at the two COMM1 ports is greater than a predefined duration, the signal is considered to be a turn signal circuit activation signal, the corresponding turn signal circuit is thus considered to be active, and communications between devices 110 and 122 is therefore inhibited. If, on the other hand, the signal duration present at the two COMM1 ports is less than or equal to the predefined duration, the signal is considered to be a communications signal, the corresponding turn signal circuit is considered to be inactive, and further communications between devices 110 and 122 is permitted.

Figure 3:
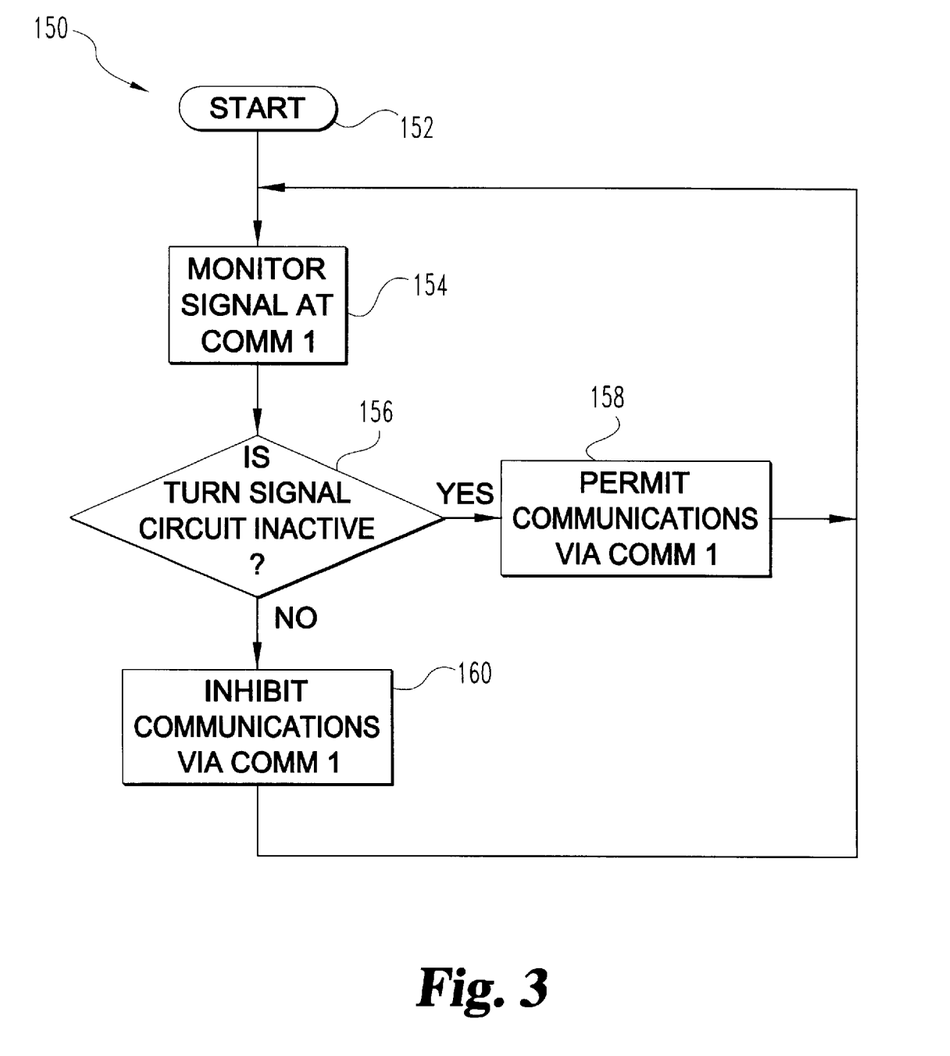
FIG. 3 is a flowchart illustrating one embodiment of a software algorithm for managing a communications link between a tractor and a trailer, in accordance with another aspect of the present invention.

Referring now to FIG. 3, a flowchart is shown illustrating one embodiment of a software algorithm 150 for managing communications between tractor communications device 110 and trailer communications device 122 as just described. Preferably, algorithm 150 is resident within memory of each device 110 and 122 and is executed by each of the devices 110 and 122 many times per second to thereby permit devices 110 and 122 to continually manage communications therebetween. The algorithm 150 begins at step 152 and at step 154, both the tractor communications device 110 and the trailer communications device 122 monitor their respective COMM1 port. Thereafter at step 156, each device 110 and 122 tests whether the turn signal circuit connected to its respective COMM1 port is inactive according to any of the techniques described hereinabove. If inactive (dormant), algorithm execution continues at step 158 where each device 110 and 122 permits communications between the two COMM1 ports over the corresponding turn signal circuit. If, on the other hand, each device 110 and 122 determines at step 156 that the turn signal circuit connected to its respective COMM1 port is active, meaning that electrical power is currently being supplied to the turn signal circuit, algorithm execution continues at step 160 wherein each device 110 and 122 inhibits communications between the two COMM1 ports over the corresponding activated turn signal circuit. Algorithm execution continues from either step 158 or step 160 back to step 154 to restart the monitoring process.

In accordance with the foregoing embodiment of the present invention, communications between tractor communications device 110 and trailer communications device 122 is permitted only when the turn signal circuit connected to the two COMM1 ports is dormant (inactive). For some special purpose trailer electrical systems 124, "real time" communications between devices 110 and 122 is riot required and the communications scheme just discussed provides adequate communications capability. However, other special purpose trailer electrical systems 124 do require "real time" communications between devices 110 and 122, and the present invention addresses such a need by providing an alternate communications path between devices 110 and 122 when the turn signal circuit connected to the COMM1 ports is active.

In accordance with an alternate embodiment of the present invention, the present invention takes advantage of the fact that, during normal operation of a tractor/trailer combination, activation of the "left turn" signal circuit is mutually exclusive of activation of the "right turn" signal circuit. As shown ill FIG. 2, both the tractor communications device 110 and trailer communications device 122 are optionally equipped with an additional communications port COMM2 which is connected to the turn signal circuit corresponding to the turn signal circuit path comprising electrical lines $58_1/68_1$. If devices 110 and 122 determine that the turn signal circuit connected to the two COMM1 ports is currently active and communications between devices 110 and 122 via the two COMM1 ports is therefore inhibited, such communications is routed to the inactive turn signal circuit and communications between devices 110 and 122 is carried out between the two COMM2 ports according to the various techniques described hereinabove with respect to communications via the COMM1 ports.

Figure 4:
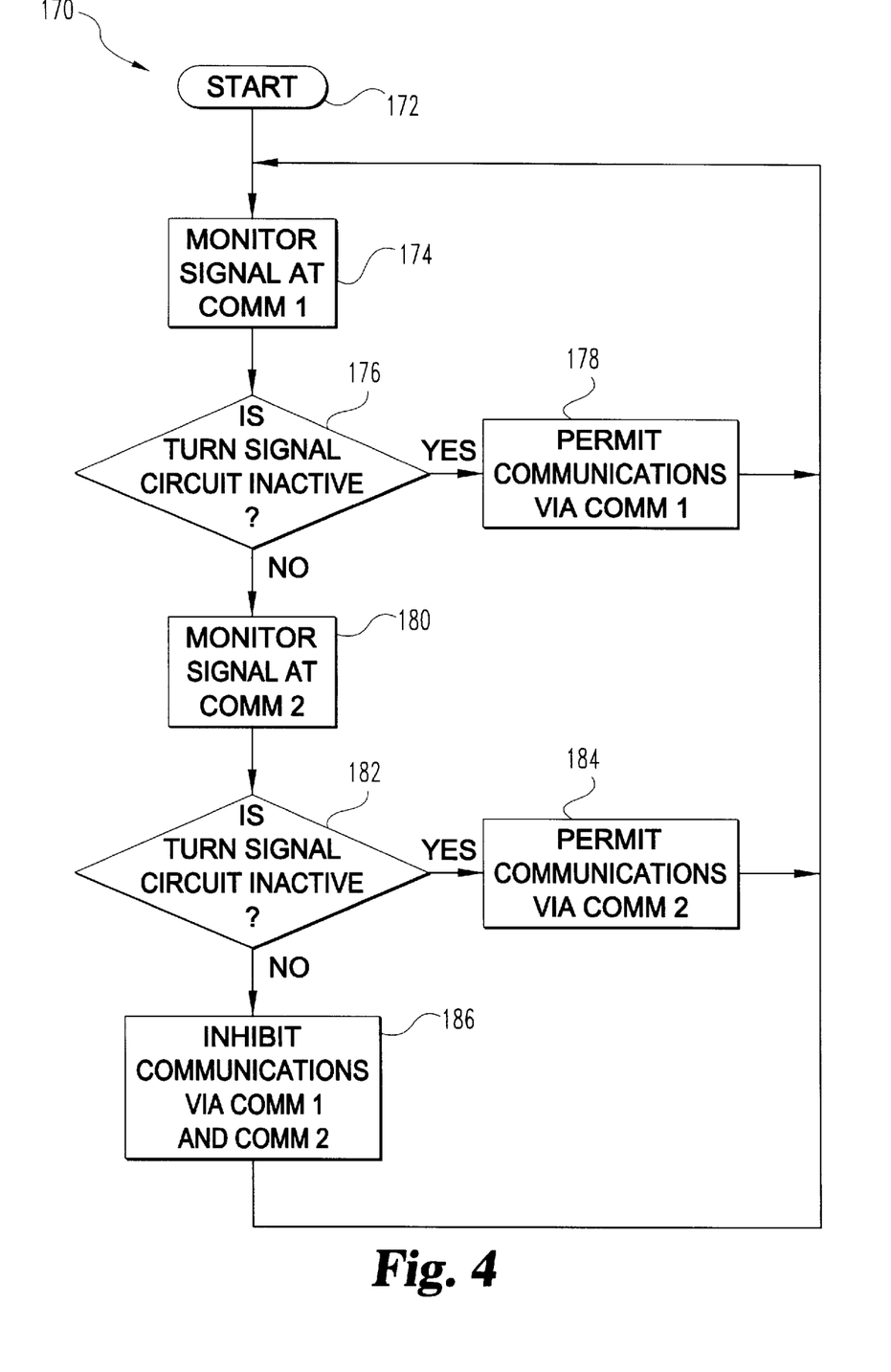
FIG. 4 is a flowchart illustrating an alternate embodiment of a software algorithm for managing a communications link between a tractor and a trailer, in accordance with the present invention.

Referring now to FIG. 4, a flowchart is shown illustrating one embodiment of an alternate software algorithm 170 for managing communications between tractor communications device 110 and trailer communications device 122 via either the COMM1 ports or the COMM2 ports as just described. As with algorithm 150, algorithm 170 is preferably resident within memory of each device 110 and 122 and is executed by each of the devices 110 and 122 many times per second to thereby permit devices 110 and 122 to continually manage communications therebetween. The algorithm 170 begins at step 172 and at step 174, both the tractor communications device 110 and the trailer communications device 122 monitor their respective COMM1 port. Thereafter at step 176, each device 110 and 122 tests whether the turn signal circuit connected to its respective COMM1 port is inactive according to any of the techniques described hereinabove. If inactive, algorithm execution continues at step 178 where each device 110 and 122 permits communications between the two COMM1 ports over the corresponding dormant turn signal circuit. If, on the other hand, each device 110 and 122 determines at step 176 that the turn signal circuit connected to its respective COMM1 port is active, meaning that electrical power is currently being supplied to the turn signal circuit connected to the two COMM1 ports, algorithm execution continues at step 180 wherein both the tractor communications device 110 and trailer communications device 122 monitor their respective COMM2 port. Thereafter at step 182, each device 110 and 122 tests whether the turn signal circuit connected to its respective COMM2 port is inactive according to any of the techniques described hereinabove. If inactive, algorithm execution continues at step 184 where each device 110 and 122 permits communications between the two COMM2 ports over the corresponding dormant turn signal circuit. If, on the other hand, each device 110 and 122 determines at step 182 that the turn signal circuit connected to its respective COMM2 port is active, meaning that electrical power is currently being supplied to to the turn signal circuit connected to the two COMM2 ports, algorithm execution continues at step 186 wherein each device 110 and 122 inhibits communications between the two COMM2 ports over the corresponding activated turn signal circuit. Algorithm execution continues from any of steps 178, 184 or 186 back to step 174 to restart the monitoring process.

In the execution of algorithm 170, it is to be understood that steps 180, 182 and 186 may be omitted such that the "No" branch of step 176 connects directly to step 184. Under normal operation to the tractor/trailer combination, as discussed hereinabove, operation of the two turn signal circuits is mutually exclusive and algorithm 170 therefore need not monitor the turn signal circuit connected to the two COMM2 ports for activity thereon. However, steps 180, 182 and 186 of algorithm 170 further take into account that under emergency conditions an emergency lamp flashing circuit of the tractor (not shown) may be activated wherein both turn signal circuits are simultaneously periodically activated. Under such conditions, steps 180, 182 and 186 of algorithm 170 may be include to ensure that communications between devices 110 and 122 are inhibited via either the COMM1 or COMM2 ports, although it is generally understood that under such conditions, the tractor/trailer combination is either stopped or operating under less than normal capacity conditions.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. For example, while the foregoing invention has been described as establishing communications between a tractor communications device 110 and a trailer communications device 122, it is to be understood that the- tractor communications device 110 may in fact be located in a trailer of a multiple trailer arrangement. The trailer communications device 122 in such a setup then corresponds to a communications device located in another trailer of the multiple trailer arrangement. Such an interpretation of the meanings of the terms "tractor" and "trailer" is consistent with the definition of these terms set forth in the BACKGROUND section.

What is claimed is:

1. A tractor communication system for establishing communications with an external system comprising:

an electrical connector mounted to a tractor and having a number of electrical terminals adapted for connection to an electrical system external to the tractor;

a tractor electrical system including a first turn signal circuit having a first turn signal circuit path connected to one of said electrical terminals of said electrical connector; and a communications device having a first communications port connected to said first turn signal circuit path, said communications device monitoring said first communications port and permitting communications over said first turn signal circuit path as long as said first turn signal circuit is inactive.

2. The tractor communication system of claim 1 further including means for periodically activating said first turn signal circuit.

3. The tractor communication system of claim 2 wherein said electrical connector is an SAE J-560 electrical connector.

4. The tractor communication system of claim 1 wherein said tractor electrical system includes a second turn signal circuit having a second turn signal circuit path connected to another one of said electrical terminals of said electrical connector;

and wherein said communications device includes a second communications port, said communications device permitting communications over said second turn signal circuit path if said first turn signal circuit is active.

5. A trailer communication system for establishing communications with an external system comprising:

an electrical connector mounted to a trailer and having a number of electrical terminals adapted for connection to an electrical system external to the trailer;

a trailer electrical system including a first turn signal circuit having a first turn signal circuit path connected to one of said electrical terminals of said electrical connector; and a communications device having a first communications port connected to said first turn signal circuit path, said communications device monitoring said first communications port and permitting communications over said first turn signal circuit path as long as said first turn signal circuit is inactive.

6. The trailer communication system of claim 5 further including a turn signaling device connected to said first turn signal path, said turn signaling device responsive to an active state of said first turn signal circuit to produce a turn signal.

7. The trailer communication system of claim 6 wherein said electrical connector is an SAE J-560 electrical connector.

8. The trailer communications system of claim 5 wherein said trailer electrical system includes a second turn signal circuit having a second turn signal circuit path connected to another one of said electrical terminals of said electrical connector;

and wherein said communications device includes a second communications port, said communications device permitting communications over said second turn signal circuit path if said first turn signal circuit is active.

9. The trailer communication system of claim 5 further including a special purpose trailer electrical system connected to said communications device, said communications device providing information relating to said special purpose trailer electrical system on said first turn signal circuit path when communications over said first turn signal circuit is permitted.

10. A tractor and trailer communications link comprising:
a tractor electrical system associated with a tractor and including a first turn signal circuit defining a first turn signal circuit path;

a tractor communications device associated with the tractor and having a first communications port connected to said first turn signal circuit path of said tractor electrical system;

a trailer electrical system associated with a trailer and including a first turn signal circuit defining a first turn signal circuit path;

a trailer communications device associated with the trailer and having a first communications port connected to said first turn signal circuit path of said trailer electrical system; and an electrical connection device extending between the tractor and trailer and connecting said first turn signal circuit path of said tractor electrical system to said first turn signal circuit path of said trailer electrical system to thereby complete a first turn signal circuit, said tractor and trailer communications devices monitoring said first communications ports respectively thereof and permitting communication therebetween over said first turn signal circuit as long as said first turn signal circuit is inactive.

11. The tractor and trailer communications link of claim 10 further including means associated with the tractor for periodically activating said first turn signal circuit path.

12. The tractor and trailer communications link of claim 11 further including a turn signaling device connected to said first turn signal path of said trailer electrical system, said turn signaling device responsive to an active state of said first turn signal circuit to produce a turn signal.

13. The tractor and trailer communications link of claim 10 wherein said electrical connection device is an SAE J-1067 electrical connection cable.

14. The tractor and trailer communications link of claim 13 further including a first electrical connector mounted to the tractor and defining a number of electrical terminals therein;

and wherein said first turn signal circuit path of said tractor electrical system is connected to one of said electrical terminals of said first electrical connector.

15. The tractor and trailer communications link of claim 14 further including a second electrical connector mounted to the trailer and defining a number of electrical terminals therein;

and wherein said first turn signal circuit path of said trailer electrical system is connected to one of said electrical terminals of said second electrical connector.

16. The tractor and trailer communications link of claim 15 wherein each of said first and second electrical connectors are SAE J-560 electrical connectors.

17. The tractor and trailer communications link of claim 10 wherein said tractor electrical system includes a second turn signal circuit defining a second turn signal circuit path, and said tractor communications device includes a second communications port connected to said second turn signal circuit path of said tractor electrical system;

and wherein said trailer electrical system includes a second turn signal circuit defining a second turn signal circuit path, and said trailer communications device includes a second communications port connected to said second turn signal circuit path of said trailer electrical system;

and wherein said electrical connection device connects said second turn signal circuit path of said tractor electrical system to said second turn signal circuit path of said trailer electrical system to thereby complete a second turn signal circuit;

and wherein said tractor and trailer communications devices each permit communications therebetween over said second turn signal circuit if said first turn signal circuit is active.

18. The tractor and trailer communications link of claim 10 further including a special purpose trailer electrical system associated with the trailer and connected to said trailer communications device, said trailer communications device providing information relating to said special purpose trailer electrical system on said first turn signal circuit path when communications over said first turn signal circuit is permitted.

19. A method of establishing a communications link between a tractor and a trailer, comprising the steps of:
connecting a first tractor turn signal circuit to a first trailer turn signal circuit to complete a first turn signal circuit;

monitoring said first turn signal circuit; and establishing a communications link on said first turn signal circuit as long as said first trailer turn signal circuit is inactive.

20. The method of claim 19 further including the steps of:
connecting a second tractor turn signal circuit to a second trailer turn signal circuit to complete a second turn signal circuit; and establishing a communications link on said second turn signal circuit if said first turn signal circuit is active.

* * * * *